United States Patent
Moghe et al.

(10) Patent No.: US 10,907,974 B2
(45) Date of Patent: Feb. 2, 2021

(54) REAL-TIME UPDATES TO MAPS FOR AUTONOMOUS NAVIGATION

(71) Applicant: Cisco Technology, Inc., San Jose, CA (US)

(72) Inventors: Ashok K. Moghe, Pleasanton, CA (US); John G. Apostolopoulos, Palo Alto, CA (US); Avraham A. Poupko, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 426 days.

(21) Appl. No.: 15/488,945

(22) Filed: Apr. 17, 2017

(65) Prior Publication Data
US 2018/0299274 A1    Oct. 18, 2018

(51) Int. Cl.
| | |
|---|---|
| *G01C 21/32* | (2006.01) |
| *G06F 16/29* | (2019.01) |
| *H04L 29/08* | (2006.01) |
| *G01C 21/36* | (2006.01) |
| *H04W 4/44* | (2018.01) |
| *H04W 4/021* | (2018.01) |

(52) U.S. Cl.
CPC ......... *G01C 21/32* (2013.01); *G01C 21/3635* (2013.01); *G06F 16/29* (2019.01); *H04L 67/12* (2013.01); *H04W 4/44* (2018.02); *H04W 4/021* (2013.01)

(58) Field of Classification Search
CPC ..... G01C 21/32; G01C 21/3635; G06F 16/29; H04L 67/12; H04W 4/021
See application file for complete search history.

(56) References Cited

U.S. PATENT DOCUMENTS

| | | |
|---|---|---|
| 7,426,437 B2 | 9/2008 | Breed et al. |
| 8,527,199 B1 | 9/2013 | Burnette et al. |
| 8,954,217 B1 | 2/2015 | Montemerlo et al. |
| | (Continued) | |

FOREIGN PATENT DOCUMENTS

JP    04446252 B2    4/2010

OTHER PUBLICATIONS

Darrell M. West, "Moving forward: Self-driving vehicles in China, Europe, Japan, Korea, and the United States", Center for Technology Innovation at Brookings, Sep. 2016, 32 pages.

(Continued)

*Primary Examiner* — Charles J Han
(74) *Attorney, Agent, or Firm* — Edell, Shapiro & Finnan, LLC

(57) ABSTRACT

Presented herein are techniques for updating detailed maps used to navigate an autonomous vehicle. The techniques include determining that a vehicle has come within a predetermined range of a road side unit, establishing a communication link with the vehicle, receiving, from the vehicle, data sufficient to identify a vehicle type of the vehicle, based on the vehicle type, selecting a map, stored by the road side unit, for the vehicle, sending a query to a neighbor road side unit seeking data to augment the map, in response to the query, receiving the data to augment the map from the neighbor road side unit, updating the map based on the data to augment the map to obtain an updated map, and sending at least a aspects of the updated map to the vehicle.

17 Claims, 5 Drawing Sheets

(56) References Cited

U.S. PATENT DOCUMENTS

| | | |
|---|---|---|
| 9,518,830 B1 | 12/2016 | Breed |
| 2007/0152804 A1* | 7/2007 | Breed .................. B60N 2/2863 340/435 |
| 2010/0063729 A1* | 3/2010 | Goto ...................... G01C 21/26 701/533 |
| 2014/0358414 A1 | 12/2014 | Ibrahim et al. |

OTHER PUBLICATIONS

Heiko G. Seif, et al., "Autonomous Driving in the iCity-HD Maps as a Key Challenge of the Autonomous Industry", Engineering 2 (2016) 159-162, Jun. 23, 2016, http://dx.doi.org/10.1016/J.ENG.2016.02.010, 4 pages.

Daniel Sparks, "Testa: All New Vehicles Are Shipped With Sensors for Autonomous Driving", https://www.fool.com/investing/2016/10/20/tesla-all-new-vehicles-are-shipped-with-sensors-fo.aspx, Oct. 20, 2016, 8 pages.

RSM, "Revolutionizing Urban Mobility", https://www.rsm.ie/, downloaded Jul. 9, 2019, 1 page.

MetroTech Net, Inc., "The Way to End Traffic Congestion", https://metrotech-net.com/, downloaded Jul. 9, 2019, 4 pages.

TheGuysTravel, "Curb Your Enthusiasm—Test Driving the Car Periscope—Season 8 Ep. 8", https://www.youtube.com/watch?v=YQRm1cg8T8I, Aug. 8, 2011, 1 page.

MPN Component, Inc., "10 Times Speed-up: Producing High-Quality 3D Maps from Lidar", https://lidarnews.com/project-showcase/10-times-speed-up-producing-high-quality-3d-maps-from-lidar/2/, May 20, 2016, 4 pages.

* cited by examiner

REAL-TIME UPDATES TO MAPS FOR AUTONOMOUS NAVIGATION

TECHNICAL FIELD

The present disclosure relates to vehicle navigation.

BACKGROUND

Autonomous vehicles use various computing systems to aid in the transport of a person or people, items, or cargo from one location to another. Some autonomous vehicles may require initial input or continuous input from an operator. Other systems, including, e.g., autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

These autonomous vehicles may maneuver themselves between locations using highly detailed maps and/or models in conjunction with sensors for detecting the vehicle's surroundings. If the detailed maps are incorrect, it may be particularly difficult or impossible for the vehicle to safely and efficiently navigate without input from the operator.

DESCRIPTION OF EXAMPLE EMBODIMENTS

Overview

Presented herein are techniques for updating detailed maps used to navigate an autonomous vehicle. The techniques include determining that a vehicle has come within a predetermined range of a road side unit, establishing a communication link with the vehicle, receiving, from the vehicle, data sufficient to identify a vehicle type of the vehicle, based on the vehicle type, selecting a map, stored by the road side unit, for the vehicle, sending a query to a neighbor road side unit seeking data to augment the map, in response to the query, receiving the data to augment the map from the neighbor road side unit, updating the map based on the data to augment the map to obtain an updated map, and sending at least aspects of the updated map to the vehicle.

Also presented herein is a device that includes an interface unit configured to enable network communications, a memory, and one or more processors coupled to the interface unit and the memory, and configured to: determine that a vehicle has come within a predetermined range of a road side unit, establish a communication link with the vehicle, receive, from the vehicle, data sufficient to identify a vehicle type of the vehicle, based on the vehicle type, select a map, stored by the road side unit, for the vehicle, send a query to a neighbor road side unit seeking data to augment the map, in response to the query, receive the data to augment the map from the neighbor road side unit, update the map based on the data to augment the map to obtain an updated map, and send at least aspects of the updated map to the vehicle.

Example Embodiments

Figure 1:
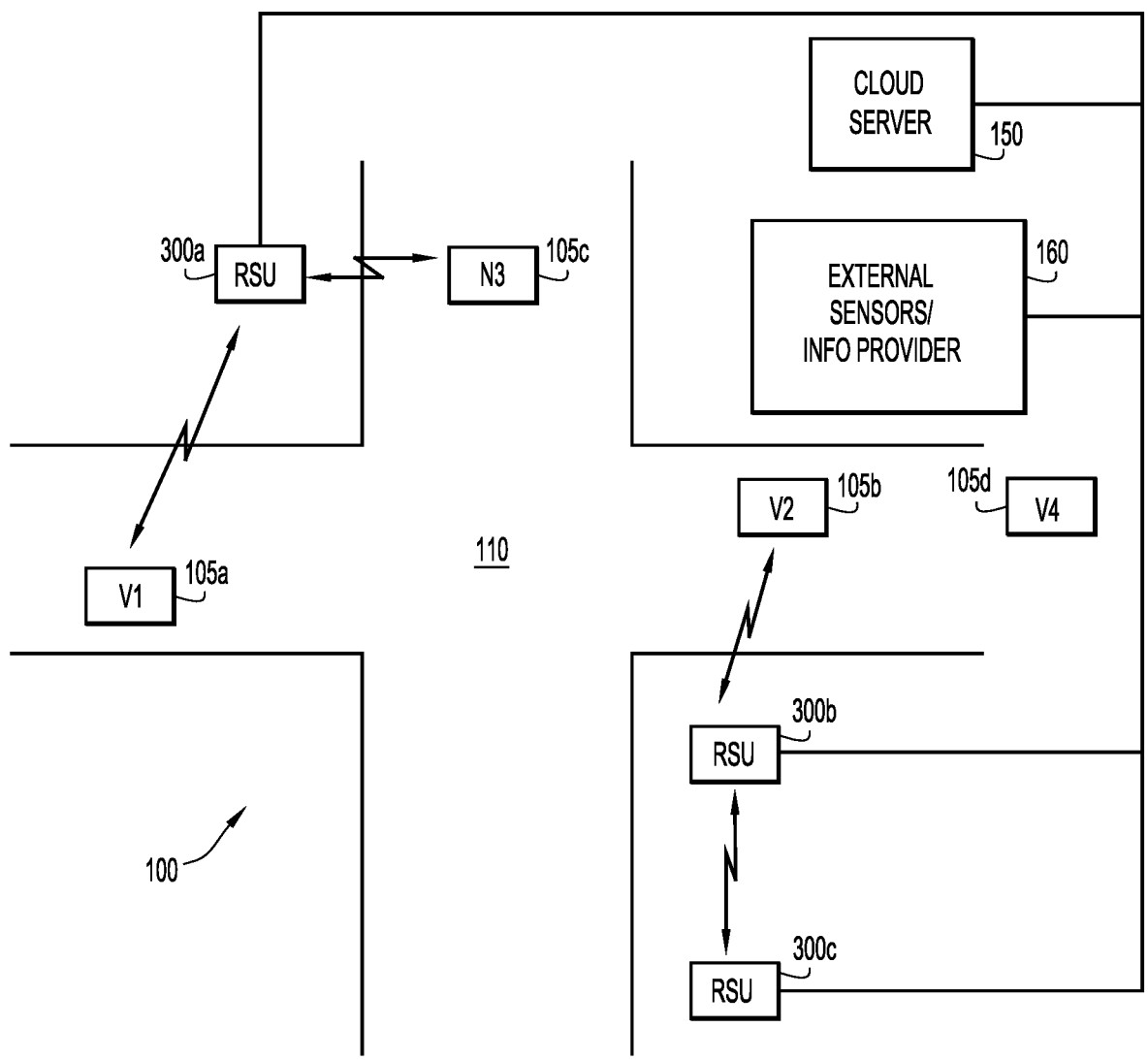
FIG. 1 depicts a scene and network components to maintain updated maps and related information for autonomous vehicles in accordance with an example embodiment.

FIG. 1 depicts a scene 100 and network components that are used to maintain updated maps and related information for autonomous vehicles in accordance with an example embodiment. Specifically, in the example embodiment, scene 100 includes a road intersection 110. Several vehicles 105a (V1), 105b (V2), 105c (V3) are depicted in the roadway. A plurality of road-side units (RSUs) 300a, 300b, 300c are deployed in the vicinity of the intersection 110 and along (e.g., adjacent, above) the roadways. Each of the RSUs is also in communication with a central or cloud server 150 and one or more external sensors or information providers 160. Cloud server 150 may be configured to maintain overall control over the RSUs, and map generation and distribution. That is, cloud server 150 may operate as both an administrator of the RSUs and as a processor to generate maps, or at least provide data to the RSUs to generate maps locally.

Although not shown in FIG. 1, those skilled in the art will appreciate that scene 100 may include a host of other elements such as lane markers (white, yellow lines, etc.), curbs, guardrails, highway dividers, buildings, trees, parked cars, pedestrians, road work sites, stop signs, traffic signals, among other possible features. Such features can all be part of the detailed maps that are generated and supplied to the vehicles.

As will be described more fully below, vehicles 105a, 105b, 105c operate by, among other things, consulting a stored detailed (3D) map to compute where to drive/navigate. As such, it is important that the detailed map is as accurate and up to date as possible. Unfortunately, elements of a scene, such as scene 100, can change relatively quickly compared to a baseline map that might be stored within a given vehicle. A given change might be transient such as a lane closure, or an accident. Other changes may be more permanent including a new traffic sign or a new building that has been constructed. A vehicle that is presented with a scene that does not match its currently stored map may become confused and either stop in a failsafe mode, or drive/navigate in a manner that is unsafe.

Thus, the several RSUs 200a, 200b, 200c are used, in accordance with the instant embodiments, to maintain updated versions of the maps and to provide to relevant vehicles the updated versions of the maps or a set of deviation data that enables a given vehicle to properly update its stored map to a most up to date version. As will also be discussed further below, the RSUs can communicate with one another, the vehicles, cloud server 150 and other external sensors/information provider 160 to better ascertain if/when updates to a given map may be warranted. The RSUs can also be used to control what data may be uploaded to cloud server 150. That is, each RSU may be used to throttle the amount of data that flows toward cloud server 150 in an effort to avoid using too much bandwidth and overwhelming cloud server 150 with unnecessary, outdated or duplicative data.

Figure 2:
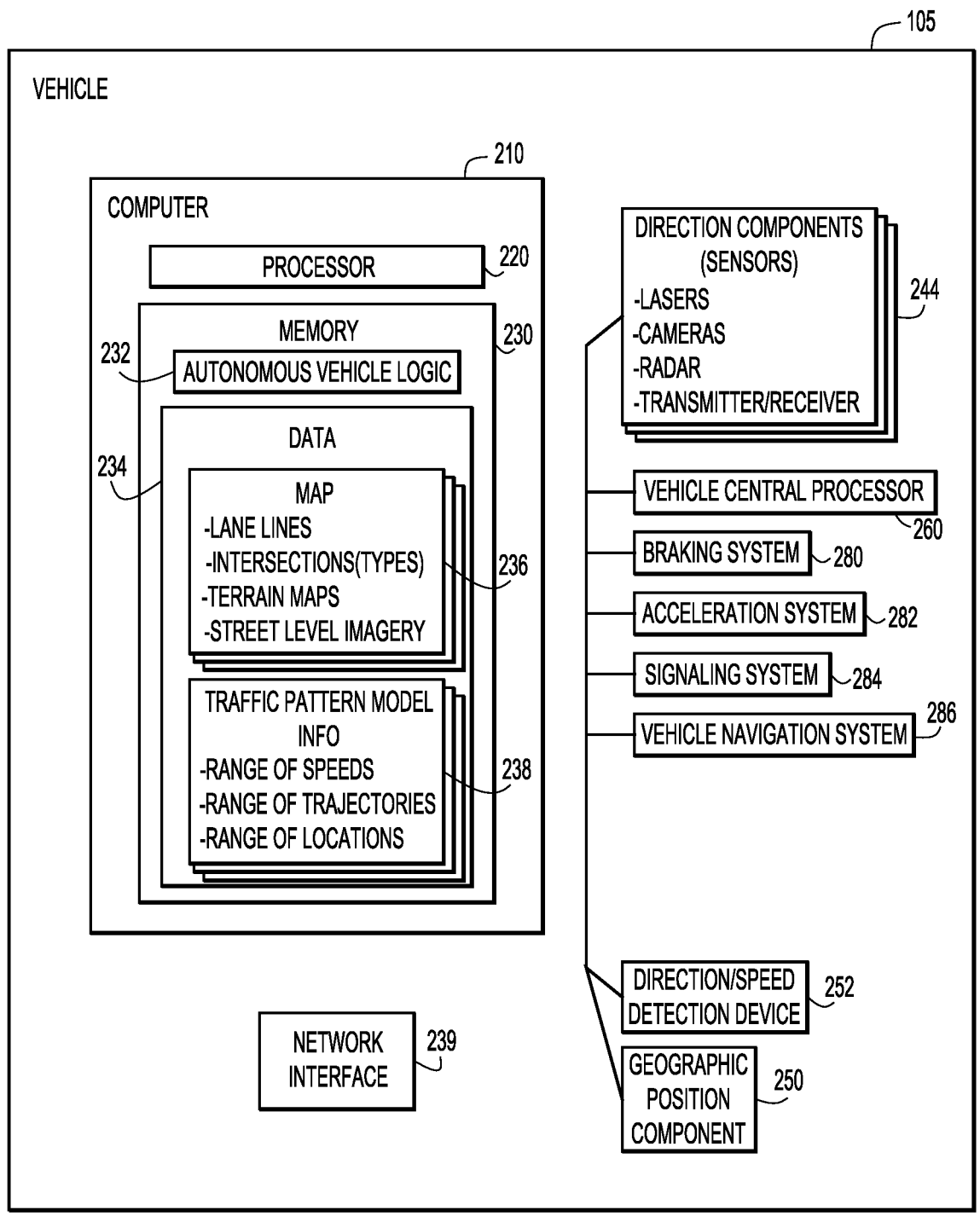
FIG. 2 is depicts features of an autonomous vehicle in accordance with an example embodiment.

FIG. 2 depicts features of an autonomous vehicle 105 in accordance with an example embodiment. Autonomous vehicle 105 may be any type of vehicle including, but not limited to, a car, truck, drone, motorcycle, bicycle, bus, boat, airplane, helicopter, lawnmower, recreational vehicle, amusement park vehicle, piece of farm equipment, piece of construction equipment, tram, golf cart, train, and trolley. The vehicle may have one or more computers, such as a computer 210 containing a processor 220, memory 230 and other components typically present in general purpose computers.

Processor 220 may be any conventional processor, such as commercially available central processing units (CPUs) and/or graphics processing units (GPUs). Alternatively, the processor may be a dedicated device such as an application specific integrated circuit (ASIC) or other hardware-based processor. Although FIG. 2 functionally illustrates the processor, memory, and other elements of computer 210 as being within the same block, it will be understood by those of ordinary skill in the art that the processor, computer, or memory may actually comprise multiple processors, computers, or memories that may or may not be stored within the same physical housing.

In various aspects described herein, the processor 220 may be located remotely from the vehicle 105 and communicate with the vehicle 105 wirelessly. In other aspects, some of the processes described herein are executed on a processor disposed within the vehicle 105 and others by a remote processor, including taking the steps to execute a given maneuver.

The memory 230 stores information accessible by the processor 220, including autonomous vehicle logic (or instructions) 232 and data 234 that may be executed or otherwise used by the processor 220. The memory 230 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The autonomous vehicle logic 232 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein.

The data 134 may be retrieved, stored or modified by processor 220 in accordance with the autonomous vehicle logic 232.

The data may include environmental data that was obtained at a previous point in time and is expected to persist regardless of the vehicle's presence in the environment. For example, data 234 may include a map 236, e.g., a highly detailed 3D map that represents the shape and elevation of roadways, lane lines, intersections, crosswalks, speed limits, traffic signals, buildings, signs, real time traffic information, or other such features and information. These features may be persistent, and may be updated, as described in more detail below, when the vehicle 105 approaches the location of a feature in the map 236, or when the vehicle communicates with one or more RSUs. The map 236 may also include explicit speed limit information associated with various roadway segments. The speed limit data may be entered manually or scanned from previously taken images of a speed limit sign using, for example, optical-character recognition. The map 236 may also include two-dimensional street-level imagery, such as highly detailed image data depicting the surroundings of a vehicle from the vehicle's point-of-view. And, as noted, the map 236 may also include 3D terrain maps incorporating one or more of the objects listed above. The data may include, for example, environmental data that is transient, such as the accumulated snow since the last snow removal truck came by, which may have been 5 mins ago. Note that some of this transient information is beneficial to capture and share at the local RSU, but may have less value to send and add to the map in the cloud.

Data 234 may also include traffic pattern model information 238, e.g., a highly detailed model indicating the distribution of typical or expected speeds, trajectories, locations, accelerations/decelerations (changes in speed), or other such characteristics of vehicles or other moving objects on the locations of the map 236. This data may be generated, for example, by observing how vehicles, pedestrians, bicycles, etc. move at different locations in the map 236. That is, data for the traffic pattern model information 238 might be generated based on long term observation and learning of traffic patterns.

In some aspects, the traffic pattern model information 238 may indicate information pertinent to the entire road. For example, the traffic pattern model information 238 may indicate a range of speeds for vehicles travelling along a road, specific to each particular lane or independent of the lanes. The traffic pattern model information 238 may indicate a range of trajectories for vehicles travelling in particular lanes.

The vehicle may also be equipped with one or more sensors or detection components 244 for detecting objects external to the vehicle such as other vehicles, obstacles in the roadway, traffic signals, signs, trees, buildings, weather, etc. The detection components or sensors 244 may include lasers, sonar, radar, LIDAR, cameras or any other detection devices which record data and which may be processed by the computer 210.

Computer 210 may be capable of communicating with various components of the vehicle 105. For example, the computer 210 may be in communication with the vehicle's central processor 260 and may send and receive information from the various systems of vehicle 105, for example the braking 280, acceleration 282, signaling 284, navigation 286, direction/speed detection device 252 and geographic position component 250 systems in order to control the movement, speed, etc. of vehicle 105. In addition, when engaged, computer 210 may control some or all of these functions of vehicle 105 and thus be fully or partially autonomous. Finally, vehicle 105 includes a network interface 239 that may be used to communicate, e.g., wirelessly, with a given RSU 300. This wireless communication provides a rich set of data to the RSU 300 that can be leveraged to augment and update the map 236, as will be discussed below.

Figure 3:
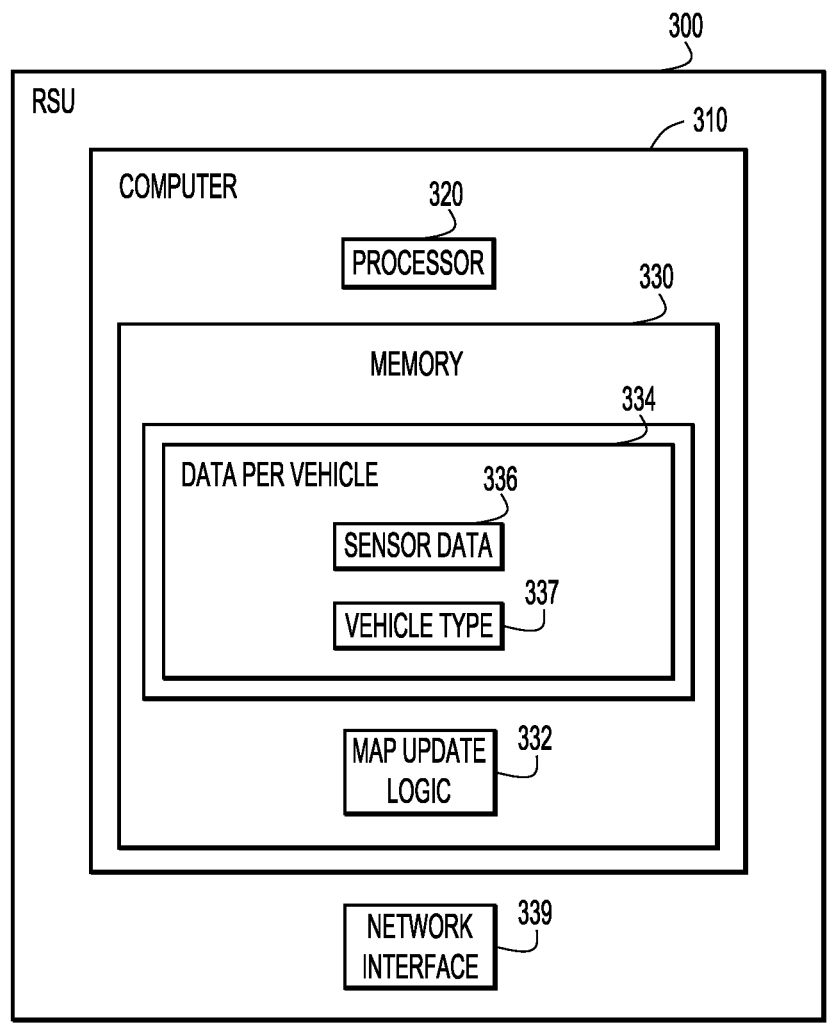
FIG. 3 depicts features of a road-side unit in accordance with an example embodiment.

FIG. 3 depicts features of an RSU 300 in accordance with an example embodiment. A road-side unit 300 includes a computer 310, which may be similar to computer 210, and a processor 320, which may be similar to processor 220. A memory 330 may be configured to store map update logic 332, i.e., computer logic or code encoded in a computer readable medium similar to that described for autonomous vehicle logic 232, and data 334 for multiple vehicles 105 that may be within a predetermined range of the RSU 300. Data 334 may include sensor data 336 received wirelessly from respective vehicles via network interface 339 and may further include, for example, data about a type of the vehicle 337. For example, the vehicle may be a truck or a car, a bicycle, or a drone. In accordance with embodiments described herein, the type of vehicle can be used to determine what sort of map or map update is to be provided to the vehicle, or what type of information or data might be missing from the vehicle's already stored map 236 such that the RSU 300 will query the vehicle, another RSU, or cloud server 150 to obtain additional/selected information that may be more useful for that particular type of vehicle.

In operation, each RSU 300 is configured to store a base map, and is further configured to update that base map using map update logic 332. For example, cloud server 150 might deliver a base map to RSU 300 at a point in time. That same base map may also be supplied to any one of the vehicles 105. Thereafter, a given vehicle, assume vehicle 105b for purposes of discussion, travels by RSU 300b and supplies sensor data to RSU 300b, enabling RSU 300b to augment or update its base map. Updates to the base map might include parked cars, accidents, new road signs, the fact that ice has been detected on the road, or that there is a pot hole in a particular location, among other elements that might further elaborate on, or otherwise update a base map. RSU 300b might also obtain updates from cloud server 150 and external sensors/information provider 160 (e.g., weather forecasts, upcoming construction notices, etc.) to still further update its base map.

When yet another vehicle, e.g., 105d, enters a zone covered by RSU 300b, the vehicle 100d communicates with RSU 300b to verify that the vehicle's currently stored base map matches the base map which is stored in the RSU. This comparison could be performed, for example, by the vehicle sending, to RSU 300b, a hash value of the base map stored in the vehicle 105d. RSU 300b can then confirm that the base maps match. RSU 300b can then send, e.g., a map deviation data set to the vehicle 105d based on the information RSU 300b previously received from the earlier passing vehicle 105b. That is, RSU 300b might send to the vehicle 105d a collection of information delineating the differences between the base map stored in the vehicle 105d and the updated map that has been generated by the RSU over recent time. It is noteworthy that because a deviation data set typically has less overall data than a full map, the transfer time needed for the vehicle to obtain the map deviation data set from RSU 300b is less than the time needed to send a full map.

If RSU 300b determines that vehicle 105d has a different base map from the currently-stored based map in RSU 300b, then RSU 300b can send the updated map, or its currently-stored base map, as a new base map to vehicle 105d.

The map deviation data set transmitted to vehicle 105d can be a function of (1) location of vehicle, (2) current direction (e.g., speed) and type of vehicle, and (3) intended or anticipated next steps in driving trajectory. Depending on the context (such as location, direction, speed, intended trajectory, etc.), an overlay of dynamic information such as traffic can be delivered. Such context is particularly relevant and scalable at the "edge," i.e., at the RSU network level, as opposed to the cloud server 150 level.

For example, if a vehicle is driving northbound on a road, the information that is most valuable to it will probably be different from information related to driving southbound. Similarly, when a vehicle approaches an intersection, the most valuable information depends on (a) where it is coming from and (b) where it is going, e.g., driving northbound (coming from the south) and planning to turn right at the intersection. Therefore, when a vehicle communicates with an RSU 300, the vehicle may provide such information enabling the RSU 300 to provide the most appropriate information back to the vehicle.

Thus, in the instant embodiments, once a given RSU 300 learns where a vehicle might be going next, or determines that information might be missing from its own stored map, the RSU can communicate and query a neighbor RSU to obtain further map data to update its own map and then deliver the updated map or map deviation data set to the vehicle.

Figure 4:
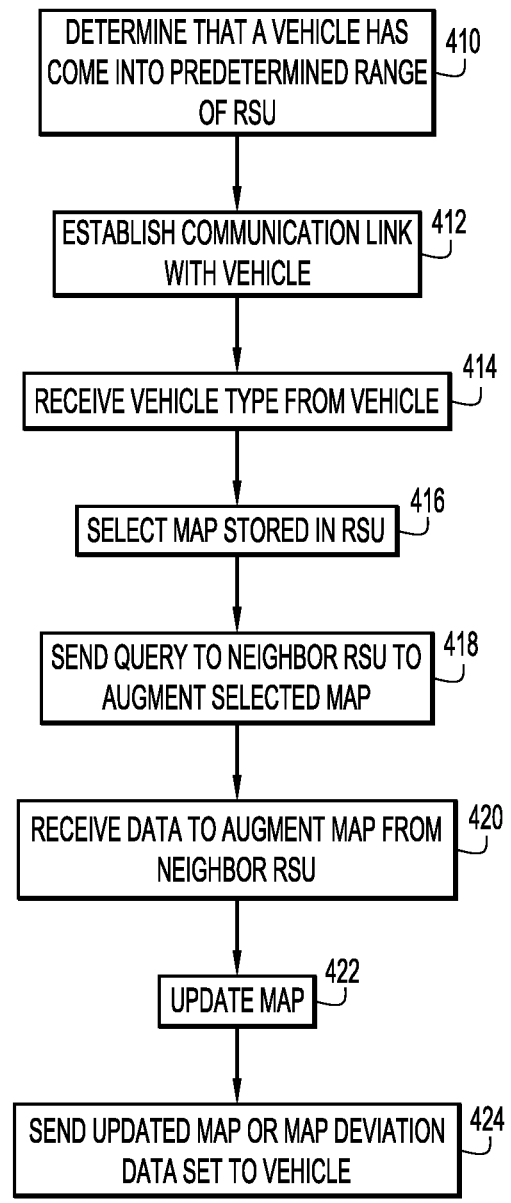
FIG. 4 is a flow chart depicting a series of operations that may be performed by map update logic operated by a road-side unit in accordance with an example embodiment.

FIG. 4 is a flow chart depicting a series of operations that may be performed by map update logic 332 operated by a road-side unit 300 in accordance with an example embodiment. At 410 the RSU determines that a vehicle has come within a predetermined range. At 412, the RSU establishes a communication link with the vehicle. At 414, the RSU receives, from the vehicle, data sufficient to identify a type of the vehicle (or where it is travelling, or any other number of characteristics about the vehicle) This step might also include obtaining a type/version of the map that that vehicle has stored to establish the base map. At 416, and based on the vehicle type (or other characteristic), the RSU selects a map, stored by the road side unit, for the vehicle. Selecting a map may comprise, e.g., selecting aspects of the base map that are most relevant to the type of vehicle or where the vehicle is programmed to travel. At 418, the RSU sends a query to a neighbor RSU seeking data to augment the map (or type of map) that has been selected. At 420, the RSU receives the data to augment the map from the neighbor RSU. At 422 the RSU updates the selected map (or type of map) based on the data to augment the map to obtain an updated map. At 424 the RSU sends at least a portion of the updated map to the vehicle. That is, the RSU sends a map deviation data set to the vehicle or sends a complete updated map to the vehicle.

By having RSUs communicate with one another it is possible to minimize the amount of information exchanged with a cloud server 150 (which might otherwise be responsible for collecting all data from all RSU and coordinating which information to provide to which vehicles), thus minimizing the amount of bandwidth consumed in the network.

In connection with selecting an appropriate map, the scope of the updated map or map deviation data set sent from the RSU 300 to the vehicle 105 might depend on vehicle type, e.g., a light bicycle versus an 18-wheeler truck. At the network edge (the RSU level), the RSU 300 can scale the map in size, information content and perspective, and create a version that is tailored to the target vehicle' needs and capabilities.

In accordance with a further embodiment, there can be a communication exchange between the RSU 300 and the vehicle 105 during which the RSU 300 queries the vehicle to determine what data would be most useful to transmit, and what data might be unnecessary to transmit. That is, the vehicle might request specific information. For example, a passenger might want to know if there is traffic several blocks away. The RSU can then communicate with the relevant neighbor RSU to obtain the requested data.

Adaptive Edge Computing

Conventional approaches to ensuring that vehicles have the most up to date maps are cloud-based where sensor data collected by the vehicle is sent to the cloud, e.g., cloud server 150. In such configurations, the RSUs might operate merely as pass through devices or conduits for information between a given vehicle and the cloud. However, it can take a significant amount of bandwidth and related cost to send large volumes of data to the cloud. The cost may come in the form of scaling that involves increased CPU and memory resources in the cloud. Such scaling issues might also result in increased communication latency between a vehicle and the cloud, proving detrimental to the vehicle's decision making process. Adaptive processing at the edge (RSU level) addresses this problem. For example, consider an RSU that experiences a continuous stream of vehicles that travel by. More specifically, assume that 20 vehicles pass a given RSU over the course of one minute. These 20 vehicles will likely send the identical or very nearly identical sensor data or telemetry. In accordance with the instant embodiments, instead of transmitting each of the 20 vehicles' sensor data to the cloud, the RSU 300 can instead process this data or telemetry and determine common aspects and characteristics and thus send a reduced amount of data to the cloud.

For example, the RSU can be configured to identify duplicate information and only transmit non-duplicative information to the cloud server 150.

The RSU can be configured to identify complementary information and send only the complementary information to the cloud server 150.

The RSU can use the sensor data to compose a map or model and only send the resulting map or model to the cloud server 150.

The RSU can be configured to use the sensor information to refine the map or model and only send the refinement to the cloud server 150.

The RSU can be configured to identify higher priority information (e.g., detecting an erratic car driving in the wrong direction), and give bandwidth priority to such information.

Thus, the RSU can build and continuously refine a map or model, estimating gaps, and then requesting the types of data that would fill the gaps. A key element of the above is feedback between the RSU and either the vehicle and/or other RSUs to guide what information is sent.

In addition, and in connection with the prior discussion, there can be interactions between multiple, usually neighboring RSU's. For example, one RSU may have a detailed map or model of the environment from the south side of a scene looking north, while another RSU (perhaps a more northern RSU) may have a detailed map or model of the environment from the north side of a scene looking south. Because the RSUs know their local neighbors and associated coverage areas, a given RSU can query a neighbor RSU having the data or information that is being sought to fill a gap in the map or model stored in the given RSU. The resulting updated map or model can then be shared with (1) vehicles, (2) still other neighboring RSUs, and (3) the cloud server 150. Notably, the cloud server 150 is not relied upon for initial or even substantial processing. Processing is instead performed at the edge, i.e., at the RSU level. This not only mitigates bandwidth usage, it can also help avoid latency with having to rely on communication with the cloud server 150.

Figure 5:
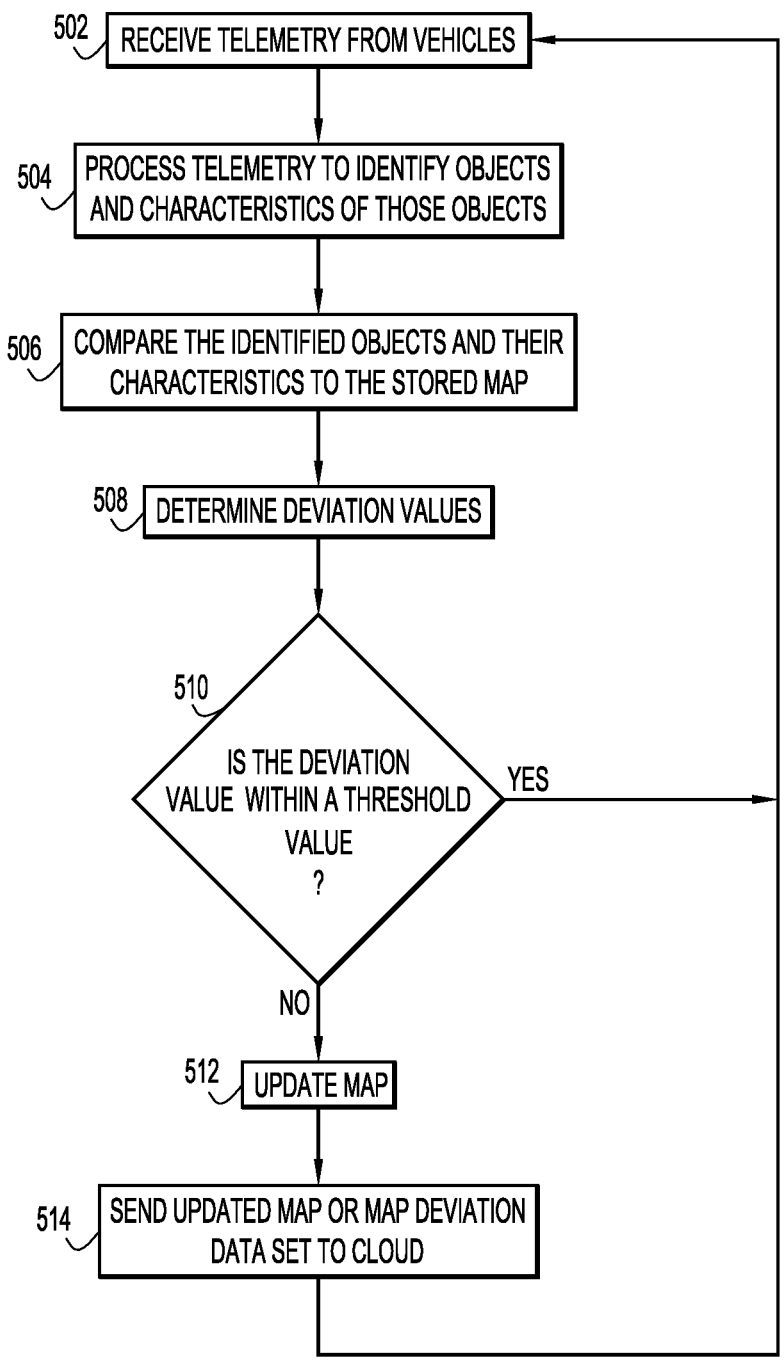
FIG. 5 is another flow chart depicting a series of operations that may be performed by map update logic in a road-side unit in accordance with an example embodiment.

FIG. 5 is another flow chart depicting a series of operations that may be performed by map update logic 332 in a road-side unit 300 in accordance with an example embodiment. These operations are employed to throttle or control the amount or quality or type of data or information that is sent to cloud server 150. That is, the described operations are performed by an RSU to determine what aspects or elements of information received from multiple vehicles should be sent to the cloud server 150, as opposed to sending all received information or data to the cloud server 150.

At 502 the RSU receives data or telemetry from one or more vehicles. For example, as described above, the RSU may receive information from a laser, camera, radar unit, etc. At 504, the RSU processes the data or telemetry to detect one or more objects and one or more characteristics (e.g., location, size, color, movement, etc.) of those one or more objects. At 506, for each detected object, the RSU compares the one or more characteristics of the detected object to its stored map. For example, a characteristic for the location or size of a stationary object may be compared to the locations of objects in the map. At 508, the RSU then determines a deviation value for the compared one or more characteristics. Deviation values can be based on percent deviation, minimum or maximum deviation, etc. At 510, the RSU determines whether the deviation values are within threshold values for the relevant characteristics. These thresholds may be determined by an administrator and may be different for different kinds of objects. If the deviation value is within a threshold, more data is collected from vehicles for processing. If at 510 the deviation values are not within the relevant threshold deviation values, the RSU, i.e., map update logic 332, updates its map. At 514, the RSU sends the updated map or a map deviation data set to the cloud server 150. It should be understood by those skilled in the art, that the same updated map or map deviation data set can also be shared with neighbor RSUs and vehicles.

It should also be noted that telemetry need not be received from all vehicles for map updating. Telemetry could be limited to certain "trusted vehicles" such as public transportation vehicles (e.g., busses, light trains), police cars, firetrucks, etc. Alternatively, the RSUs can be configured to statistically weigh telemetry received from vehicles, and that such weighting might not begin until telemetry from a threshold number of vehicles has been received. Higher weights may be given to selected vehicles whose past data has consistently proven to be accurate. Further, less transient changes can be supplied by, e.g., cloud server 150, thereby alleviating the need to provide frequent updates to every vehicle. That is, the cloud server 150 can be responsible for distributing new base maps when significant non-transient changes are made to the scene or environment.

In sum, autonomous vehicles use high definition 3D maps to augment their perception of the environment captured through their own sensors to establish a highly accurate position within the environment. However, the detailed maps suffer from enormous data sizes and the challenge of keeping them up to date, especially when relying on a cloud or central server. Embodiments described herein push much of the map processing to the edge of the network, i.e. to local RSUs, which are configured to update maps locally, communicate those maps or map deviation data sets to vehicles, and communicate selected data to the cloud. The RSUs can also communicate with another to enhance the map updating process.

In summary, in one form, a method is provided. The method includes determining that a vehicle has come within a predetermined range of a road side unit, establishing a communication link with the vehicle, receiving, from the vehicle, data sufficient to identify a vehicle type of the vehicle, based on the vehicle type, selecting a map, stored by the road side unit, for the vehicle, sending a query to a neighbor road side unit seeking data to augment the map, in response to the query, receiving the data to augment the map from the neighbor road side unit, updating the map based on the data to augment the map to obtain an updated map, and sending at least aspects of the updated map to the vehicle In an embodiment, sending at least aspects of the updated map comprises sending differences between a map stored in the vehicle and the updated map.

The method may further include receiving telemetry from a plurality of vehicles within the predetermined range, and updating the map based on the telemetry. The method may still further include determining a deviation value for an aspect of the telemetry compared to an aspect of the map, and not updating the map when the deviation value is within a predetermined threshold value. The method may further include determining a deviation value for an aspect of the telemetry compared to an aspect of the map, and further updating the map when the deviation value is beyond a predetermined threshold value. The method may still further include sending an indication of the aspect of the telemetry to a central server.

In accordance with an embodiment, updating the map may be based on data received from a central server. Updating the map may also be based on data from an external information source other than a central server.

The method may also include sending a query to the vehicle, the query enabling the vehicle to request selected information as part of the updated map.

In another form, a device is provided that includes: an interface unit configured to enable network communications, a memory, and one or more processors coupled to the interface unit and the memory, and configured to: determine that a vehicle has come within a predetermined range of a road side unit, establish a communication link with the vehicle, receive, from the vehicle, data sufficient to identify a vehicle type of the vehicle, based on the vehicle type, select a map, stored by the road side unit, for the vehicle, send a query to a neighbor road side unit seeking data to augment the map, in response to the query, receive the data to augment the map from the neighbor road side unit, update the map based on the data to augment the map to obtain an updated map, and send at least aspects of the updated map to the vehicle.

The one or more processors are further configured to send at least aspects of the updated map by sending differences between a map stored in the vehicle and the updated map.

The one or more processors are further configured to receive telemetry from a plurality of vehicles within the predetermined range, and the one or more processors are further configured to update the map based on the telemetry. The one or more processors may be further configured to determine a deviation value for an aspect of the telemetry compared to an aspect of the map, and not update the map when the deviation value is within a predetermined threshold value. The one or more processors may also be configured to determine a deviation value for an aspect of the telemetry compared to an aspect of the map, and further update the map when the deviation value is beyond a predetermined threshold value. The one or more processors may still be further configured to send an indication of the aspect of the telemetry to a central server.

In still another embodiment, a non-transitory tangible computer readable storage media encoded with instructions is provided that, when executed by at least one processor, is configured to cause the processor to: determine that a vehicle has come within a predetermined range of a road side unit, establish a communication link with the vehicle, receive, from the vehicle, data sufficient to identify a vehicle type of the vehicle, based on the vehicle type, select a map, stored by the road side unit, for the vehicle, send a query to a neighbor road side unit seeking data to augment the map, in response to the query, receive the data to augment the map from the neighbor road side unit, update the map based on the data to augment the map to obtain an updated map, and send at least aspects of the updated map to the vehicle. The instructions may further case the processor to send at least aspects of the updated map by sending differences between a map stored in the vehicle and the updated map, and/or to receive telemetry from a plurality of vehicles within the predetermined range.

The above description is intended by way of example only. Various modifications and structural changes may be made therein without departing from the scope of the concepts described herein and within the scope and range of equivalents of the claims.

What is claimed is:

1. A method comprising:
   determining, by a first road side unit, that a vehicle has come within a predetermined range of the first road side unit;
   establishing a communication link between the first road side unit and the vehicle;
   receiving, by the first road side unit, from the vehicle, an indication of a vehicle type of the vehicle;
   based on the vehicle type, the first road side unit selecting a map, stored by the first road side unit;
   sending, by the first road side unit, to a second road side unit, a query requesting augmented map data;
   in response to the query, the first road side unit receiving the augmented map data from the second road side unit;
   updating, by the first road side unit, the map based on the augmented map data resulting in an updated map; and
   sending, from the first road side unit, at least aspects of the updated map to the vehicle,
   wherein the predetermined range of the first road side unit is stored in the second road side unit, and a predetermined range of the second road side unit is stored in the first road side unit, and wherein the first road side unit sends the query requesting augmented map data to the second road side unit using the predetermined range of the second road side unit stored in the first road side unit.

2. The method of claim 1, wherein sending at least aspects of the updated map comprises sending differences between a map stored in the vehicle and the updated map.

3. The method of claim 1, further comprising receiving sensor data from a plurality of vehicles within the predetermined range.

4. The method of claim 3, further comprising further updating the map based on the sensor data.

5. The method of claim 3, further comprising determining a deviation value between the sensor data and an aspect of the map, and further updating the map when the deviation value is beyond a predetermined threshold value.

6. The method of claim 5, further comprising sending an indication of the sensor data to a central server.

7. The method of claim 1, further comprising further updating the map based on data received from a central server.

8. The method of claim 1, further comprising further updating the map based on data from an external information source other than a central server.

9. A device comprising:
   an interface unit configured to enable network communications;
   a memory; and
   one or more processors coupled to the interface unit and the memory, and configured to:
   determine that a vehicle has come within a predetermined range of the device;
   establish a communication link with the vehicle;

receive, from the vehicle, an indication of a vehicle type of the vehicle;

based on the indication of the vehicle type, select a map, stored by the device;

send a query to a road side unit requesting augmented map data;

in response to the query, receive the augmented map data from the road side unit;

update the map based on the augmented map data resulting in an updated map; and send at least aspects of the updated map to the vehicle, wherein the predetermined range of device is stored in the road side unit, and a predetermined range of the road side unit is stored in the device, and wherein the device sends the query requesting augmented map data to the road side unit using the predetermined range of the second road side unit stored in the device.

10. The device of claim 9, wherein the one or more processors are further configured to send at least aspects of the updated map by sending differences between a map stored in the vehicle and the updated map.

11. The device of claim 9, wherein the one or more processors are further configured to receive sensor data from a plurality of vehicles within the predetermined range.

12. The device of claim 11, wherein the one or more processors are further configured to update the map based on the sensor data.

13. The device of claim 11, wherein the one or more processors are further configured to determine a deviation value between the sensor data and an aspect of the map, and further update the map when the deviation value is beyond a predetermined threshold value.

14. The device of claim 13, wherein the one or more processors are further configured to send an indication of the sensor data to a central server.

15. A non-transitory tangible computer readable storage media encoded with instructions that, when executed by at least one processor, is configured to cause the at least one processor to:

determine that a vehicle has come within a predetermined range of a first road side unit;

establish a communication link with the vehicle;

receive, from the vehicle, an indication of a vehicle type of the vehicle;

based on the indication of the vehicle type, select a map, stored by first the road side unit;

send a query, to a second road side unit, requesting augmented map data;

in response to the query, receive the augmented map data from the second road side unit;

update the map based on the augmented map data resulting in an updated map; and send at least aspects of the updated map to the vehicle, wherein the predetermined range of the first road side unit is stored in the second road side unit, and a predetermined range of the second road side unit is stored in the first road side unit, and wherein the first road side unit sends the query requesting augmented map data to the second road side unit using the predetermined range of the second road side unit stored in the first road side unit.

16. The computer readable storage media of claim 15, further comprising instructions to cause the processor to:

send at least aspects of the updated map by sending differences between a map stored in the vehicle and the updated map.

17. The computer readable storage media of claim 15, further comprising instructions to cause the processor to:

receive sensor data from a plurality of vehicles within the predetermined range.

\* \* \* \* \*